Jan. 15, 1957  G. N. FISHER  2,777,770
PACKAGING
Filed June 27, 1950
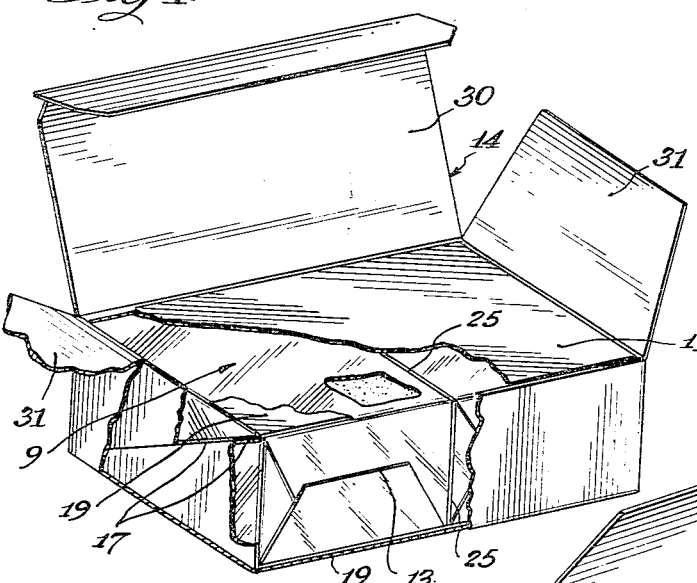
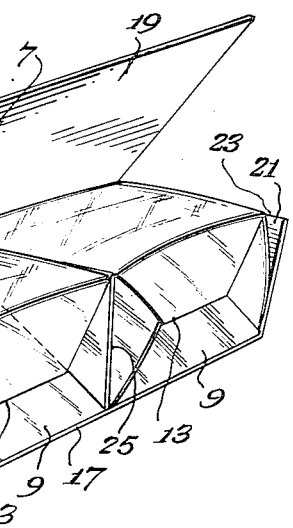
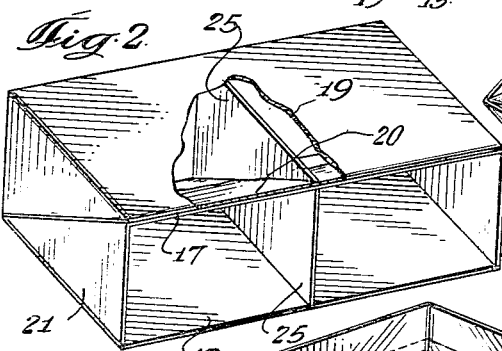
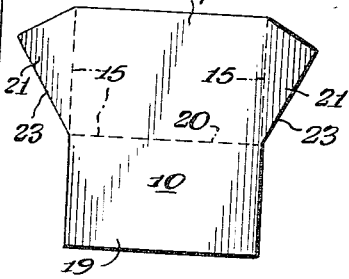
Inventor
Guy Norwood Fisher
By Soans Pond + Anderson
Attorneys

United States Patent Office 2,777,770
Patented Jan. 15, 1957

2,777,770
PACKAGING

Guy Norwood Fisher, Wilmette, Ill., assignor to Kraft Foods Company, Chicago, Ill., a corporation of Delaware Application June 27, 1950, Serial No. 170,649

3 Claims. (Cl. 99—178)

This invention relates, in general, to the art of packaging food and more particularly to the packaging of plastic comestibles which are enclosed in nonrigid containers.

Certain types of plastic comestibles, as for example certain process cheese products, are marketed in the form of wedge-shaped blocks which are enclosed in a pouch or envelope of pliable sheet material. In one method of preparing this type of package, a preformed, pliable envelope or pouch is placed in a mold having a wedge shape and the envelope is filled with the cheese product as it is discharged in a fluid state from the processing apparatus. The envelope is then sealed and the entire assemblage consisting of the mold, envelope, and cheese product, is cooled to solidify the cheese product and the packaged cheese unit is then removed from the mold. A number of the wedge-shaped units of cheese product are then placed in a suitable carton for shipping.

While the wedge-shaped form of package has distinct advantages from the standpoint of sales promotion, it is more difficult to fill the handle than the usual rectangular shaped packages which are usually employed for this type of product. Moreover, the removal of the envelope of cooled cheese product from the mold and the packaging of the number of cheese units in the shipping cartons is likely to damage the envelopes so as to impair the keeping quality of the cheese and so as to distort the shape of the packaged unit. In addition, the handling of the envelopes containing the cooled body of cheese product tends to separate the envelope from the surface of the cheese body. This separation promotes the growth of mold and, therefore, greatly shortens the shelf-life of the finished packaged unit.

Accordingly, the principal object of the invention is the provision of an improved method of packaging plastic comestibles such as cheese products in wedge-shaped nonrigid containers. Another object of the invention is the provision of an improved container construction for plastic materials which are to be packaged in a wedge shape. Other objects and advantages of the invention will become known from the following description and the accompanying drawings.

In the drawings:

Fig. 1 is a fragmentary, perspective view of an improved container for wedge-shaped units, embodying various features of the invention. This view shows the manner in which the individual wedge-shaped units are disposed within the container;

Fig. 2 is a perspective view of a superposed pair of liner members which constitute a part of the assembled shipping carton illustrated in Fig. 1, the wedge-shaped units being removed for purposes of clarity;

Fig. 3 is a plan view of a blank of sheet material from which the liner members of Fig. 2 are fabricated;

Fig. 4 is a perspective view of one of the liner members shown in Fig. 2, the liner being in a position to receive the plastic comestibles to be packaged; and Fig. 5 is a fragmentary, perspective view showing a pair of envelopes or pouches inserted in a mold, one of the envelopes having been filled with the fluid comestible and sealed, the other being ready for filling.

The invention will be described as it is employed in connection with packaging of cheese products known as cheese spreads. However, it is to be understood that the package and packaging method described in the following paragraphs are applicable to various plastic comestibles in wedge shapes.

In general, a package embodying various of the features of the invention may be fabricated by providing a liner member 7 (Figs. 2, 3 and 4) which is adapted to receive one or more preformed envelopes 9 which contain the product to be packaged in a plastic state. The liner member 7 illustrated is formed from a blank 10 of sheet material (Fig. 3) which is so cut that it will fold into a wedge of right triangular cross-section. In producing the final package, preformed envelopes 9 are inserted into a suitable mold 11 having one or more mold cavities 12 which are shaped in the form of a right triangular prism (Fig. 5). The envelopes 9 are then filled with the heated fluid cheese product and are sealed as shown at 13 in Figs. 1, 4, and 5. The envelope 9, while the cheese product is still limp and pliable, is then removed from the mold 11 and placed on the liner 7 as shown in Fig. 4. Since the cheese in the envelope is in a fluid or pliable state, the envelope 9 may be readily removed from the mold and since the mass has not hardened or set, no damage is done to the cheese contained in the envelope.

A plurality of units of the cheese product each of which comprises a liner 7 and a pair of filled and sealed envelopes 9, are superposed in a rectangular shipping carton 14 (Fig. 1) which closely fits therearound, the shipping carton 14 closing the open side of the liners 7 and preventing the envelopes 9 of material from becoming distorted as the product cools. Before cooling, the heated cheese product runs into all of the corners of the wedge-shaped compartments defined by the liner members 7 and the carton 14 so that the final cooled cheese product has a regular shape with smooth surfaces and sharp edges. The entire shipping carton of packaged cheese spread is then shipped without any need for further handling of the individual blocks of merchandise.

The embodiment of the invention illustrated in the drawings, the wedge-shaped liner 7, is fabricated from the pre-cut blank 10 shown in Fig. 3. The blank 10 is made from relatively stiff sheet material such as bleached kraft sheet, unwaxed chipboard, or the like, having a thickness of .020 inch. The blank 10 is scored as illustrated by the dotted lines 15 in Fig. 1 to define two rectangular panels 17 and 19 which are interconnected along a common side 20. The panel 17 is proportioned to correspond in size and shape to a diagonal plane passing through the carton 14 and the panel 19 is proportioned to correspond in size and shape to the horizontal area of the carton. At each end of the panel 17, there is provided a right triangular panel 21 having its hypotenuse in common with the end of the rectangular panel 17. The width of the other rectangular panel 19 is such that it is equal to the length of the side of the triangular panel 21 as indicated at 23 in Fig. 3. When setting up the liner 7, the rectangular panels 17 and 19 are folded together along their common side 20 to provide a V-shaped trough and the triangular end panels 21 are folded inwardly to provide ends for the trough as shown in Fig. 4.

To facilitate the removal of the packaged cheese from the liners after it reaches the merchandising point, the lines of abutment between the rectangular panel 19 with the edges 23 of the triangular end panels 21 are preferably left unsealed. However, under some circumstances, it may be desirable to provide a seal, such as for example, a strip of adhesive surfaced tape or the like which connects the abutting panels.

In order to divide the wedge-shaped liner 7 into a plurality of compartments so that more than one envelope 9 may be disposed within a single liner, one or more partitions 25 (Figs. 1, 2, and 4) are provided for each liner. The partitions 25 are desirably of the same size and shape as the triangular end panels 21 and are desirably made from material of the type employed in fabricating the liner 7. In the illustrated package, a single partition 25 is inserted in the wedge-shaped liner 7 as shown in Figures 1, 2, and 4. The partition 25 need not be fastened to the walls of the liner 7 since it will be held in place by the preformed envelopes 9 and the cheese product with which they are filled.

As has been pointed out, the envelopes 9 which receive the cheese are preformed in a wedge shape to conform to the shape of the individual mold compartments or cavities in the mold 11 which shape is identical to the shape of the folded liners 7. When filling the envelopes 9, they are inserted into the mold cavities 10 with the open ends of the envelopes, indicated as 27 in Fig. 5, extending above the edges of the mold 11 a sufficient distance to provide overlapping portions with which the open ends of the envelopes are sealed. After the liner 7 and envelopes 9 are assembled, as shown in Fig. 4, the entire assemblage is placed in the shipping carton 14 while the cheese product is still in hot, fluid form. This molds the cheese product into a true shape and protects all of the sides of the formed wedge.

The shipping carton 14 illustrated is a rectangular box having a hinged cover 30 and side flaps 31. The carton 14 is of such dimensions that two superposed, wedge-shaped, filled liners 7 will produce a rectangular shape which will fit snugly within the carton 14. The snug fit between the filled liners and the enclosing box insure that the walls of the carton will produce a barrier for the fluid cheese product in the envelope 9. Thus, the envelopes 9 will not sag away from the walls of the liners while the spread is still in liquid form but will instead completely occupy the wedge shaped compartments defined by the carton 14, the liners 7, and the partitions 25. The filled carton of cheese product is then cooled, the cheese product thickening to produce sharply defined wedges having smooth, unmarred surfaces. It will be apparent that no handling of the individual wedges of cheese is required which might result in the deformation of the wedge or in the separation of the envelope 9 from the cooled product.

The carton of superposed liners containing the cheese product provides a very rigid structure which confines each of the surfaces of the wedge-shaped portion of cheese product. The rigid structure is made possible by the reinforcing action of the double-layer, diagonally disposed web which is provided by the superposed panels 17 of the two filled liners which coact to produce a rectangular shaped block which can be placed in the carton 14. In addition, the provision of the end triangular panels 21 in a position such that the hypotenuse of the panel 21 is connected to the rectangular panel 17 which extends diagonally across the carton 14, provides a reinforcing flange which resists crushing forces upon the package. The cellular construction of the packed carton strengthens the carton so that a large number of cartons may be stacked while the cheese is still in the hot, fluid form without danger of deforming the cheese wedges in the lower cartons.

When the carton arrives at the retail outlet, the wedges of cheese in their individual envelopes and liners are removed from the carton and the liner is unfolded to free the two wedges contained therein.

While the described shipping carton contains two superposed, filled liner members 7, it will be apparent that any even number of units may be stacked to provide a rectangular block which may be enclosed by a rectangular carton.

Various features of the invention which are believed new are set forth in the appended claims.

I claim:

1. A method of packaging cheese in wedge-shaped blocks which comprises the steps of providing a trough of V-shaped cross-section, inserting a pliable envelope containing a fluid mass of the cheese into said trough, placing the assemblage of trough, envelope, and fluid cheese in a container adapted to snugly enclose said assemblage whereby said fluid cheese retains the shape of said trough regardless of the position of said container, and cooling said container to thicken said cheese.

2. A method of packaging cheese in wedge-shaped blocks which comprises the steps of providing a pair of troughs of right-triangular cross-section, heating said cheese to transform it into a fluid mass, filling a plurality of pliable envelopes with said fluid mass, sealing said envelopes, placing a pair of filled envelopes in each of said troughs while said cheese is still unhardened, superposing said pair of assemblages of trough, envelope, and fluid cheese to provide a rectangular block, and enclosing said rectangular block in a rectangular container proportioned to snugly enclose said block whereby said fluid cheese retains the shape of said troughs regardless of the position of said box, and cooling said box to thicken said cheese.

3. A method of packaging cheese in wedge-shaped blocks which comprises placing a pliable open envelope in a supporting mold, pouring said cheese into said envelope while said cheese is in a fluid condition, sealing the open end of said envelope to provide a sealed package of cheese still in relatively fluid form, removing said package from said mold, placing said package, while said cheese is still relatively fluid into a supporting trough having a shape which confines the surfaces of said package into the shape of said trough, placing the trough and package in a container adapted to enclose said trough and said package snugly, and cooling said container to thicken said cheese.

References Cited in the file of this patent

UNITED STATES PATENTS

| | | |
|---|---|---|
| 1,054,433 | Masse | Feb. 25, 1913 |
| 2,065,182 | Harris | Dec. 22, 1936 |
| 2,247,341 | Anderson | June 24, 1941 |
| 2,255,492 | Peters | Sept. 9, 1941 |
| 2,308,177 | Jones | Jan. 12, 1943 |
| 2,319,956 | Snyder | May 25, 1943 |
| 2,339,305 | Wagner | Jan. 18, 1944 |
| 2,350,912 | Marshall | June 6, 1944 |
| 2,415,292 | Lamb et al. | Feb. 4, 1947 |
| 2,471,867 | Fisher et al. | May 31, 1949 |

FOREIGN PATENTS

| | | |
|---|---|---|
| 451,257 | Great Britain | July 29, 1936 |